United States Patent [19]
Collins

[11] 3,972,125
[45] Aug. 3, 1976

[54] VISUAL APPROACH AND LANDING SYSTEM FOR AIRCRAFT WITH SUPPLEMENTARY INDICATING AND WARNING DEVICES

[76] Inventor: William O. Collins, 6258 N. Kensington St., McLean, Va. 22101

[22] Filed: Feb. 7, 1975

[21] Appl. No.: 548,100

Related U.S. Application Data

[63] Continuation-in-part of Ser. No. 369,929, June 14, 1973, Pat. No. 3,868,778.

[52] U.S. Cl. .................................. 33/227; 33/286; 244/114 R; 340/26
[51] Int. Cl.² .................... G08G 5/00; G01C 21/00
[58] Field of Search ........... 33/227, 286; 244/114 R; 340/25, 26

[56] References Cited
UNITED STATES PATENTS

| | | | |
|---|---|---|---|
| 2,205,185 | 6/1940 | Adair | 340/26 |
| 2,280,126 | 4/1942 | Metcalf | 33/286 |
| 2,455,721 | 12/1948 | Abiuso | 40/217 |
| 3,191,146 | 6/1965 | Mitchell | 340/26 |
| 3,813,657 | 5/1974 | Henry | 340/26 |
| 3,868,778 | 3/1975 | Collins | 33/286 |

FOREIGN PATENTS OR APPLICATIONS

| | | | |
|---|---|---|---|
| 225,839 | 6/1958 | Australia | 340/25 |
| 830,043 | 3/1960 | United Kingdom | 244/114 R |

Primary Examiner—Richard E. Aegerter
Assistant Examiner—Richard R. Stearns
Attorney, Agent, or Firm—Clarence A. O'Brien; Harvey B. Jacobson

[57] ABSTRACT

A visual approach and landing system for aircraft including a basic slope indicator supported on or adjacent the ground in predetermined relation to a runway for visually indicating to a pilot the correct path which he should follow when approaching the runway together with supplementary warning devices to provide the pilot with a definite visual warning of a low approach and other indicating and warning devices also provided in the form of signs or symbols indicating to the pilot the direction he should look and fly ahead and upward from the approach or descent path defined by a slope indicator.

8 Claims, 19 Drawing Figures

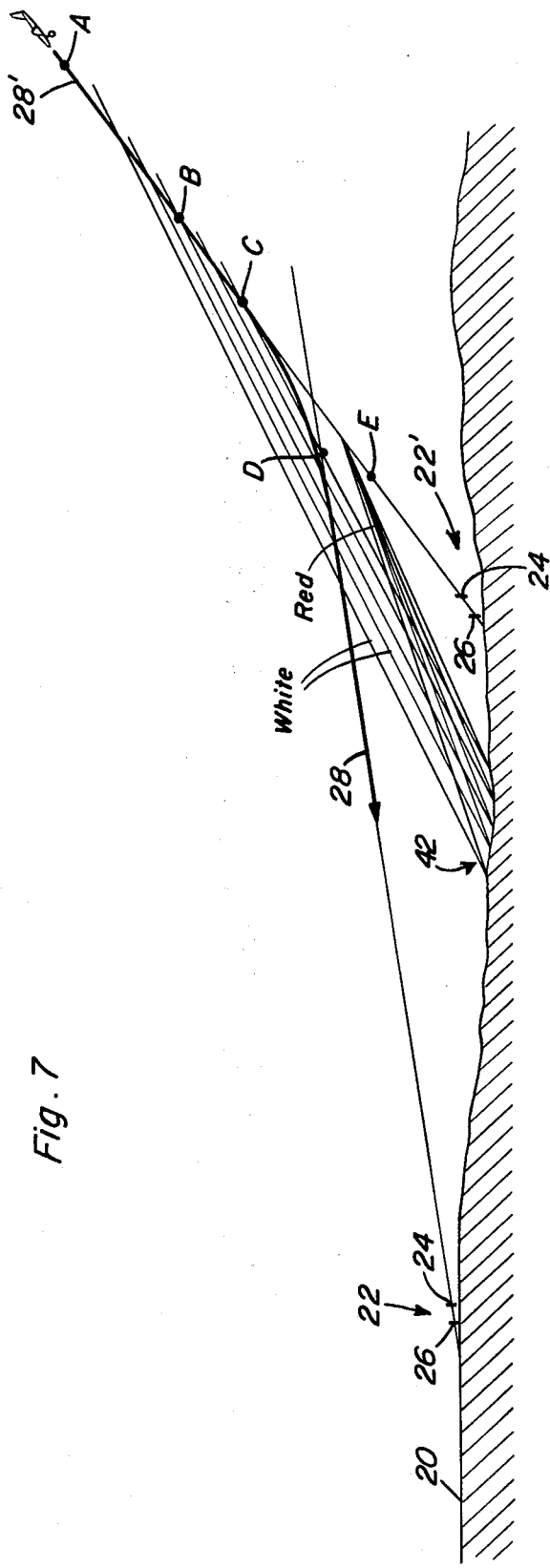
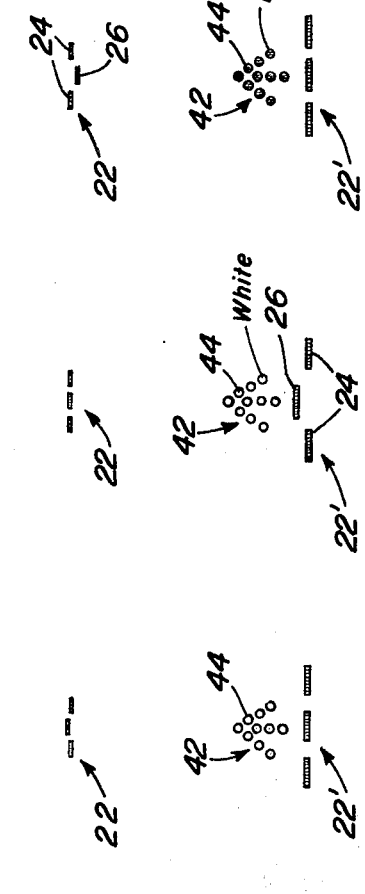

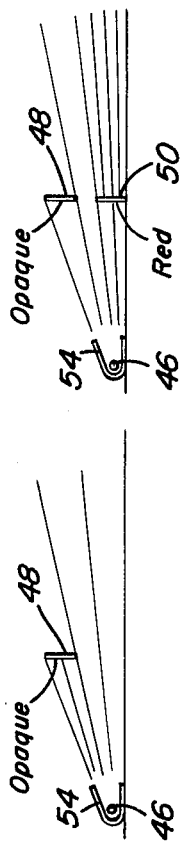
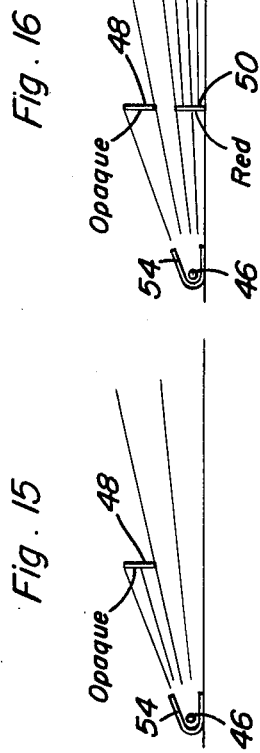
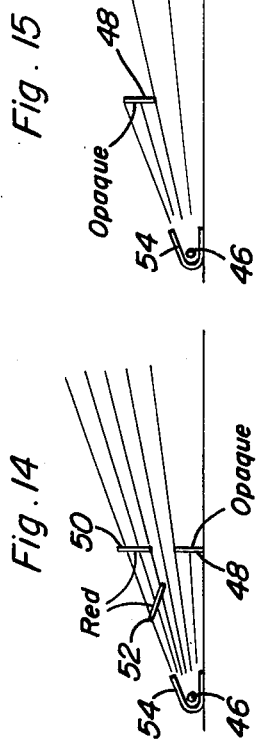
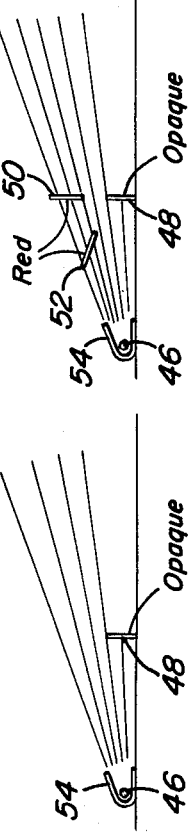
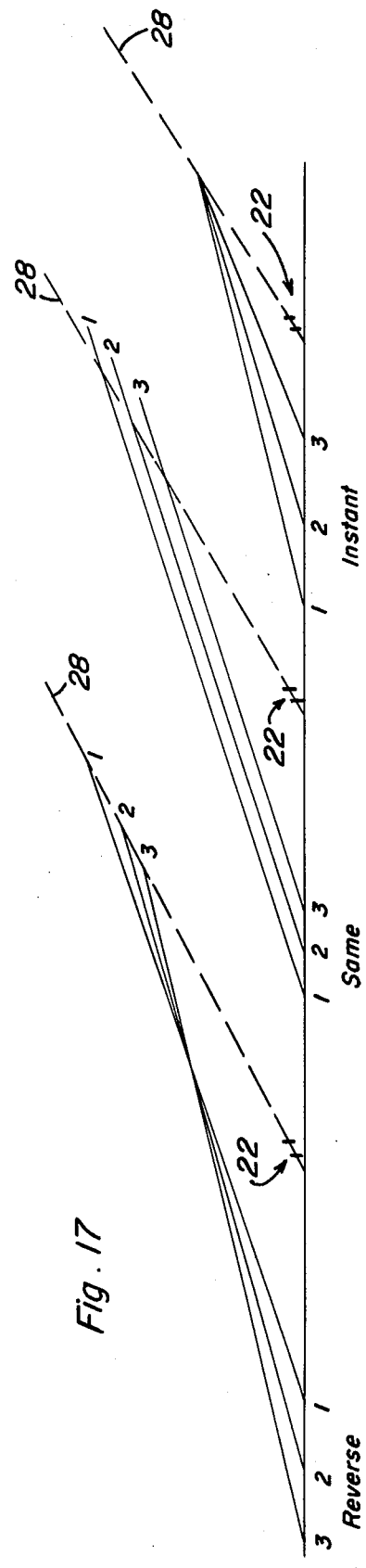
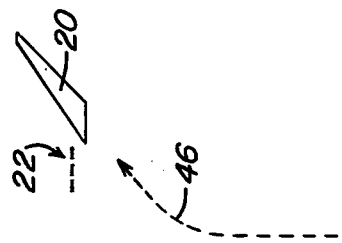
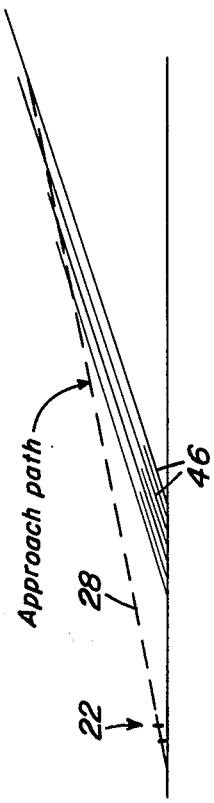

3,972,125

VISUAL APPROACH AND LANDING SYSTEM FOR AIRCRAFT WITH SUPPLEMENTARY INDICATING AND WARNING DEVICES

CROSS REFERENCE TO RELATED APPLICATION

This application is a continuation-in-part of my co-pending application Ser. No. 369,929, now U.S. Pat. No. 3,868,778 filed June 14, 1973 for VISUAL APPROACH AND LANDING SYSTEM FOR AIRCRAFT.

BACKGROUND OF THE INVENTION

1. Field of the Invention

This invention generally relates to a visual approach and landing system for aircraft having supplementary warning and indicating devices associated therewith to visually guide a pilot in his approach to a runway and to warn the pilot if his descent path is too low.

2. Description of the Prior Art

Visual indicating systems for guiding pilots during their approach to runways have been provided and are effective to some degree. Such devices are frequently rather complex and costly and fail to provide sufficient warning to a pilot that the approach path is too low and such devices also fail to provide proper guidance when using a two-segment approach for noise control in which the outer segment of the approach is steeper than the inner segment or near segment which is a more shallow approach so that appropriate flare-out and touchdown may be attained.

The following patents disclose various developments in landing guidance systems which are somewhat related to this invention.

| | |
|---|---|
| 1,349,277 | 2,991,743 |
| 2,280,126 | 3,204,218 |
| 2,455,721 | 3,259,985 |
| 2,634,399 | 3,320,584 |
| 2,691,150 | 3,447,128 |
| 2,784,925 | 3,474,406 |

SUMMARY OF THE INVENTION

An object of the present invention is to provide a visual approach slope indicator for aircraft as disclosed in my co-pending application, the disclosure of which is incorporated herein by reference thereto, combined with a warning device to indicate to a pilot that his approach is low and therefore dangerous so that he may take corrective action to return to the proper approach path. The warning device may be in the form of a red signal light or lights aimed in the direction of a low approach and so shielded that the red light could only be seen when an aircraft is below the proper approach path, in the form of a center bar of light which is normally white and which will turn red when the approach path drops to a predetermined degree below the correct path or in the form of a combination of these two embodiments.

Another object of the invention is to provide a visual approach slope indicator and landing system including supplementary indicating and warning devices in the form of signs or symbols which become visual to the pilot to indicate to the pilot that he should take some action such as a change in course or a change in the descent path by looking ahead with such devices including a red final warning in the event the pilot fails to change his enroute or approach course at the appropriate time.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF DRAWINGS

FIG. 7 is a schematic side elevational view of a two-segment approach path in which supplementary indicating or warning devices are employed.

FIGS. 8–12 are group views illustrating what is observed by the pilot when a runway or airport slope indicator is used in combination with an off runway or off airport slope indicator.

FIGS. 13–16 are schematic side elevational views illustrating various arrangements of lights, and shields and, in some instances, red lights or filters in front of white lights to provide a beam of white and/or red light of definite configurations with the relative directions of the beams also being controlled.

FIG. 17 is a schematic side elevational view illustrating sequential arrangements in which the warning or indicating lights are sequenced to appear "off", "on", and "changed to red".

FIG. 18 is a schematic side elevational view illustrating sequential guidance lights in front of a slope indicator.

FIG. 19 is a perspective view of the guidance lights of FIG. 18, the slope indicator and runway observed by the pilot when properly approaching the runway.

DESCRIPTION OF THE PREFERRED EMBODIMENT

Figure 1:
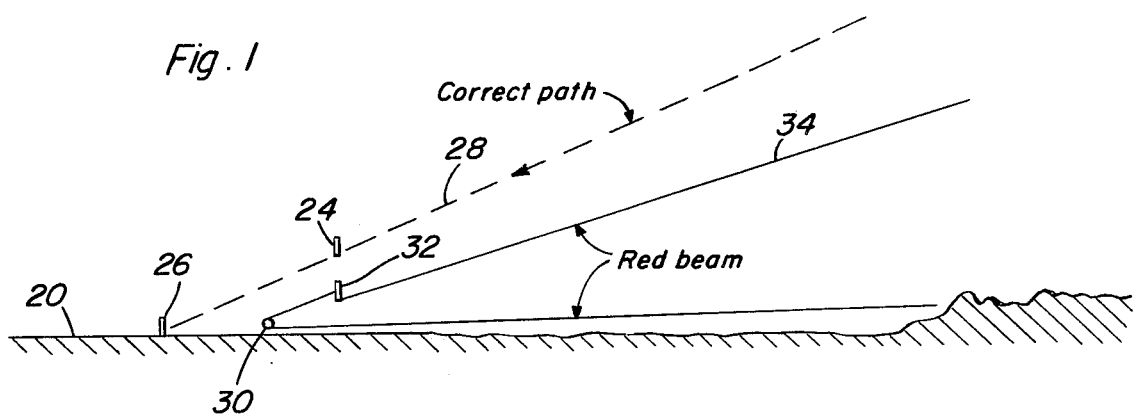
FIG. 1 is a schematic side elevational view illustrating the positioning of the visual approach slope indicator with a warning device which will warn a pilot when his approach path to a runway is too low.
Figure 2:
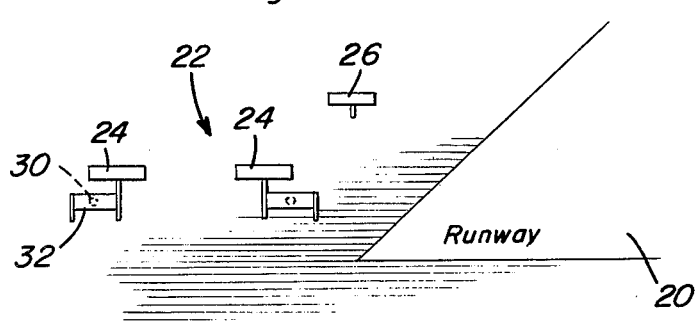
FIG. 2 is a perspective view of a runway and slope indicator with red signal lights which are normally shielded associated therewith which will be revealed to the pilot should his approach path be too low.
Figure 3:
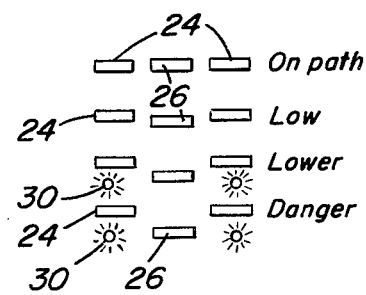
FIG. 3 is a group of views illustrating what is observed by a pilot under various conditions of approach to the runway.

Referring now specifically to FIGS. 1–3 an airport runway is schematically illustrated and designated by reference numeral 20 with a visual approach slope indicator assembly 22 positioned adjacent the runway which is in the form of a pair of horizontally aligned bars 24 that are spaced from each other and a central bar 26 is positioned between the bars 24 but is located in rearwardly spaced relation from the other two bars 24 to establish a common line of sight 28 at a predetermined angle to the ground which designates the correct approach path having a desired vertical slope so that as a pilot observes the slope indicator 22, he will know that he is on the correct approach path when the bar 26 is aligned with and between the bars 24 as illustrated in the upper portion of FIG. 3. This structure and arrangement is the same as that disclosed in the aforementioned co-pending application with the bars being illuminated, brilliantly painted, lighted or otherwise constructed for use during various visibility conditions. As the center bar 26 becomes disposed either below or above the bars 24, the pilot will know that his approach is too low or too high. Inasmuch as the too low condition is more dangerous, the present invention involves the addition of red lights 30 positioned along side of and below the bars 24 with an opaque field 32 normally occluding the lights 30.

The shields 32 would be dull in color or non-brilliant so that they would not be distracting to the pilot. As illustrated in FIG. 3, as the approach path of the aircraft is only slightly lower than the correct path 28, the center bar 26 will be observed as being slightly lower than the two bars 24. As the degree of error increases and the actual approach path of the aircraft is lower than would be considered safe, the center bar 26 is not only observed as being lower than the bars 24 but the red light 30 will become visible with the intensity of the red lights increasing as the approach path of the aircraft becomes lower in relation to the correct path. At a predetermined approach path designated 34, the red lights 30 which may be in the form of red spotlights will be observed by the pilot but since the shield 32 is still occluding most of the light 30, the light 30 will be rather dim or of small intensity. Any path of movement of the aircraft below the "red line" 34 brings the red light 30 into full view and maximum intensity thereby immediately warning the pilot of a danger condition so that he may take corrective action to pull his aircraft up to the correct approach path so that the center bar 26 becomes aligned with the bars 24 at which time the shields 32 will again occlude the red light 30.

Figure 4:
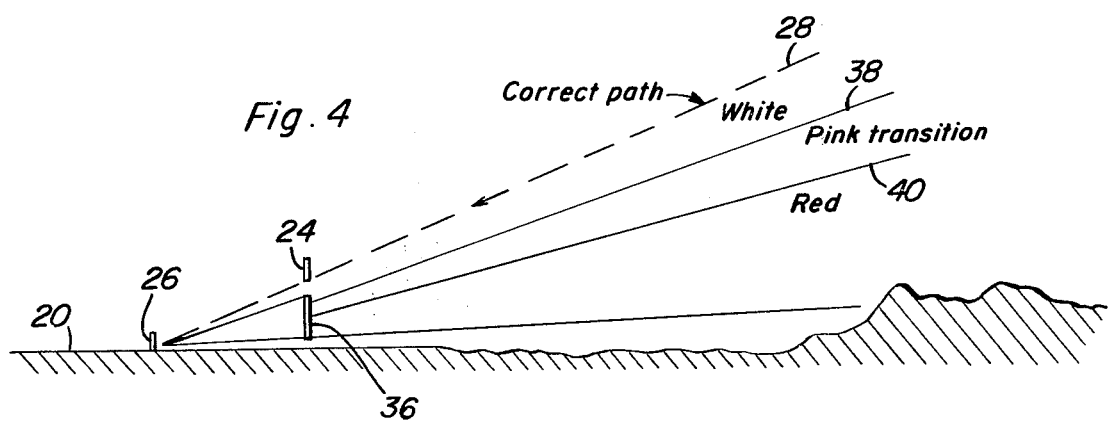
FIG. 4 is a side view similar to FIG. 1 but illustrating an arrangement in which a center light bar will turn from white to red in the event of an approach being too low.
Figure 5:
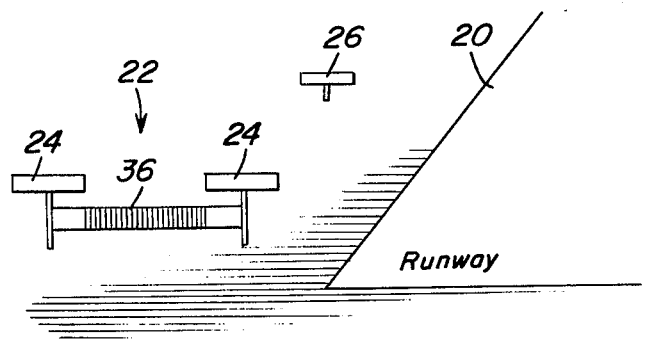
FIG. 5 is a perspective view, similar to FIG. 2, illustrating this embodiment of the invention.
Figure 6:
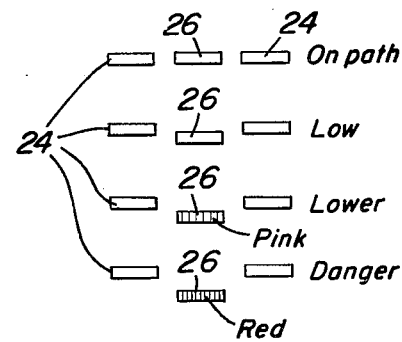
FIG. 6 is a group view, similar to FIG. 3 but illustrating the warning as it is observed by the pilot when the embodiment of FIGS. 4 and 5 is in use.

FIGS. 4–6 illustrate a similar arrangement of runway 20 and slope indicator 22 including the pair of bars 24 and the bar 26 oriented in the same manner as in FIGS. 1–3. Supported between and below the bars 24 is a transparent shield 36 which may be of plastic material or the like which is normally disposed below the center bar 26 when the pilot and aircraft are on the correct path 28 in which event the pilot observes three white lights 24 and 26 in a row and in alignment with each other as illustrated in the top illustration of FIG. 6. As the approach path of the aircraft is only slightly lower, the center white bar 26 will be observed slightly below the two end bars 24. As the aircraft approaches a path 38 which is too low for proper landing, designated as 38 in FIG. 4, the transparent shield 36 which is red in color will begin to be aligned with the center bar 26 so that the center bar or center light 26 will appear pink in color. If the aircraft is on an approach path 40 which is too low for safe landing because the plane may touch down prior to reaching the threshold of the runway, the transparent shield 36 will be completely disposed in front of the white bar 26 so that a red center bar will be observed by the pilot. The two bottom illustrations in FIG. 6 illustrate the pink transition condition of the center bar 26 and the red or danger condition thereof which red line is designated by numeral 40 in FIG. 4. Thus, if a pilot and his aircraft drops progressively below the correct path 28 where he would see the middle bar as white, he would subsequently see the middle bar as pink, that is a white and red combination, and then completely red. This embodiment of the invention operates in substantially the same manner as the embodiment in FIG. 1 and any combination of these two embodiments may be employed and any desirable structure may be provided for producing the red light or danger signal to the pilot for indicating to him that he is too far below the proper approach path, thus indicating to him that corrective action should be taken in order to put his aircraft back on the proper slope or approach to the runway 20.

FIGS. 7–12 illustrate a two-segment approach path which is now frequently required for noise control which, as illustrated in FIG. 7 includes an initial steep segment of an approach path designated by numeral 28' which may be a 6° slope and a final approach path 28 which is the same as the approach path illustrated in FIG. 1 in which a slope indicator 22 is employed in the same manner as in FIGS. 1 or 4 either with or without the low slope path warning device illustrated in FIGS. 1 or 4. In this arrangement, the 6° outer segment 28' would be guided by a slope indicator 22' located at a point spaced from the runway such as a point two miles off the runway in the approach zone with the slope indicator 22' including the same bars 24 and a center bar 26 oriented to provide a proper 6° slope indication to the pilot of the aircraft following the steep approach path 28'. The aircraft should gradually change from the steep approach segment 28' of the approach path to the shallow 3° approach segment 28 with supplementary indicating devices generally designated by numeral 42 indicating to the pilot that he should be going through a transition from the steep segment to the low segment just prior to the point at which such transition is being made. In FIG. 7 the point A is a condition illustrated in FIG. 8 in which the slope indicator 22' indicates to the pilot that he is on the appropriate steep path 28' with the slope indicator 22, of course, indicating that he is too high for the shallow segment of the approach path 28. As the aircraft reaches point B in FIG. 7, as illustrated in FIG. 9, the slope indicator 22' indicates that the aircraft is on the proper approach path and the slope indicator 22 indicates that the aircraft is still too high for the approach segment 28. In this condition, the supplementary indicating device 42 comes into view. The supplementary indicating or warning device 42 is in the form of lights, bars or the like, 44 which may be in the form of a directional control such as an arrow as illustrated in FIG. 10 but only the initial lights at the tip of the arrow are observed when the aircraft is at point B. As the aircraft proceeds along the flight path 28', the bars 24 and 26 in the slope indicator 22' will remain in line indicating that the aircraft is properly following the approach path 28' with the warning device 42 indicating to the pilot that he should maintain visual contact and look ahead of the slope indicator 22' and when the warning device 42 reveals all of the lights 44 as the aircraft reaches point C, the pilot should then look ahead toward and be guided by slope indicator 22 which indicates that he is only slightly above the shallow approach path 28 so that the controls of the aircraft may be properly manipulated for transition from the steep approach path 28' to the shallow approach path 28 which is the condition illustrated in FIG. 10. Then, as the aircraft follows the transition line from point C to point D in FIG. 7, the center bar 26 in the slope indicator 22' properly indicates that the aircraft is too high and the warning device 42 defined by the lights oriented in a pattern which illustrates an arrow indicates that the pilot should follow the flight path designated by the slope indicator 22 which indicates that the aircraft is on the appropriate approach path or the shallow approach path 28 to runway 20. In the event the aircraft pilot fails to follow the curved path of transition from the steep path 28' to the shallow path 28 and continues along a direct path to the slope indicator 22' and reaches point E, each of the lights 44 in the warning device 42 will turn red as the aircraft reaches or approaches point E as illustrated in FIG. 12 so that the pilot will be immediately warned that he should take corrective action with the red arrow also indicating that he should look ahead for guidance from the slope indicator 22 where the pilot will see that the center bar 26 is below the end bars 24, thus indicating that he should immediately pull the aircraft up so that it follows approach line 28, thus avoiding a danger condition. The transition of the light 44 from white to red may be accomplished by any of various means such as that illustrated in FIGS. 1, 4 and 16.

With this arrangement, the supplementary indicating and warning devices 42 all turn red at point E if the aircraft fails to make the transition from the 6 degree steep approach segment 28' to the 3°, shallow segment of the approach path 28. Various arrangements may be provided for designating changes in an approach path from a steep segment to a shallow segment and immediately warning the pilot of danger by red lights turning on when a point of danger is reached in the steep approach segment if he does not cause the aircraft to follow the transition path to the shallow segment of the approach path.

Variation in light units are typically illustrated in FIGS. 13–16 with FIG. 13 illustrating a light unit 46 having an opaque shield 48 confining the light beam to a particular angle of observation while FIG. 14 illustrates the same type of light unit having an opaque shield 48 and red filters oriented as designated by numeral 50 or alternatively in an angular position as designated by numeral 52. FIG. 15 illustrates the light unit in which the opaque shield 48 is oriented at the top of the light beam and FIG. 16 illustrates the light unit with the opaque shield 48 at the upper end of the light beam and the red filter 50 at the lower portion thereof with the light unit 46 in each instance having a reflector or shield 54 associated therewith. The light 46 may be in the form of a spotlight and the opaque shields shut out light in certain directions and the transparent red shields may convert the white light passing through them to red light. By appropriate orientation of the shields, each light can be made to produce a beam of white and/or red light of definite configuration with various angles of spread and in all directions. Also, the relative directions of the beam can be controlled. For example, the direction or angle at which the light can first be seen can be adjusted for each light unit so that these paths can be made more or less parallel, made to diverge, converge, and cross each other before intercepting the path of an aircraft or made to converge at a point of interception with the flight path. FIG. 17 illustrates arrangements of this nature in which the left-hand illustration in FIG. 17 illustrates three lights oriented at points 1, 2 and 3 in which the beams cross and intercept the flight path 28 which is directed toward a slope indicator 22 at points 1, 2 and 3 so that light number 1 will be observed by the pilot prior to lights 2 and 3 and the lights will be observed in a sequence. The central illustration in FIG. 17 illustrates an arrangement in which the light beams are parallel to each other and intercept the flight path 28 in the same orientation as they are on the ground. The right-hand illustration in FIG. 17 illustrates the three lights which converge at a point which intercepts the flight path 28. These arrangements can produce the effect of lights appearing in sequence in either direction or all at once even though the lights are on at all times but appear to be off to the pilot then appear to come on and can then turn red through the geometry of the shielding system. In effect, the motion of the plane on or near the proper flight path or its extension causes the off-on-change-to-red effect without employing extensive switches, mechanical equipment or the like.

FIGS. 18 and 19 illustrate schematically a slope indicator and runway together with a plurality of sequenced lights 46 which are oriented in a manner to designate or indicate to the pilot his approach path to the end of the runway 20. This arrangement is especially useful when oblique approaches to small airports are required where obstructions exist in the straight in normal approach. A sequenced flashing slight turn arrow just before the runway threshold would guide the pilot to the correct landing orientation while successfully avoiding nearby obstructions with the light units 46 being either sequenced or flashing in sequence with one of the light units at the end of the guide arrangement being in the shape of an arrow.

These devices are for nighttime use, low visibility use, or at any other time where either lights or a brightly painted fluorescent surface might be used to form the desired guidance and warning for pilots. These signs or symbols which may be in the form of arrows or pointers will indicate to the pilot to look and fly ahead or upward from the descent path defined by a slope indicator where such slope indicator is off the airport and used for enroute guidance or to turn left or right as the plane nears the slope indicator and/or alignment indicator so as to aim toward the next guide unit or the airport itself. The supplementary devices are designed to appear to the pilot at an appropriate time, such as just before he is to negotiate a change in course, either horizontal, vertical or combination thereof. The lights "come on" thus attracting his attention and in some cases, they turn red as a final warning in the event he fails to change his enroute or approach course at the proper time. The lights may be constructed to appear to the pilot in sequence either the farthest or the nearest light appearing first according to the situation and the intent of the signal. The lights may be made to change red in sequence although the most significant impact usually can be made by having all of the lights of the device change red at the same time.

The units may be configured as arrows, chevrons, turn arrows or signs such as "Up" or "Turn L" or "Turn R" and the like. The lights or bars may be supported in any suitable manner from the ground surface or any other suitable supporting structure and effectively provide supplementary indicating and warning devices to be used with the visual approach slope indicator disclosed in my co-pending application.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A visual approach indicator unit including three elongated bars, means mounting two of said bars in longitudinal alignment with each other, means mounting the third of said bars in parallel spaced relation to the two longitudinally aligned bars and centrally between said two of the bars, said two of the bars being longitudinally spaced from each other a distance slightly greater than the length of said third of the bars, visual means mounted on said bars for direct viewing of the bars themselves as closely spaced solid line segments in apparent longitudinal alignment with each other while approaching the same at a predetermined angle perpendicular to said bars, warning means with said two bars for direct viewing when approaching the bars at an angle substantially less than said predetermined angle, said warning means includes a red light, an opaque shield attached below and beside the two bars and disposed in alignment with the light for occluding the red light when approaching the elongated bars at said predetermined angle, and partially revealing said red light when approaching said bars at an angle slightly less than said predetermined angle and completely revealing the red light when approaching said bars at an angle substantially less than said predetermined angle to warn the observer that the approach path toward the bars is too low.

2. A visual approach indicator unit including three elongated bars, means mounting two of said bars in longitudinal alignment with each other, means mounting the third of said bars in parallel spaced relation to the two longitudinally aligned bars and centrally between said two of the bars, said two of the bars being longitudinally spaced from each other a distance slightly greater than the length of said third of the bars, visual means mounted on said bars for direct viewing of the bars themselves as closely spaced solid line segments in apparent longitudinal alignment with each other while approaching the same at a predetermined angle perpendicular to said bars, and warning means associated with said bars for direct viewing when approaching the bars at an angle substantially less than said predetermined angle, said central bar is in the form of a light, said warning means including a transparent red shield disposed below the said two of the bars and below the line of sight of a viewer when approaching the bars at said predetermined angle, said transparent red shield overlying and converting the light of the central bar to a red color when approaching the bars at an angle substantially less than said predetermined angle, whereby a viewer will be warned that the approach toward the central bar and said two bars is too low.

3. A visual approach indicator unit including three elongated bars, means mounting two of said bars in longitudinal alignment with each other, means mounting the third of said bars in parallel spaced relation to the two logitudinally aligned bars and centrally between said two of the bars, said two of the bars being longitudinally spaced from each other a distance slightly greater than the length of said third of the bars, visual means mounted on said bars for direct viewing of the bars themselves as closely spaced solid line segments in apparent longitudinal alignment with each other while approaching the same at a predetermined angle perpendicular to said bars, and warning means associated with said bars for direct viewing when approaching the bars at an angle substantially less than said predetermined angle, together with means visually guiding an aircraft pilot along a steep outer segment of an approach path to a shallow inner segment defined by said visual approach indicator unit, said means including an off airport indicator unit visually defining said steep outer segment and supplementary indicator means directly viewable by a pilot when the aircraft reaches a point of transition from the steep segment to the shallow segment of the approach path.

4. The structure as defined in claim 3 wherein said supplementary indicator means includes a plurality of lights arranged in the pattern of a directional arrow directing the pilot's attention to the elongated bars for guidance at said predetermined angle, said lights including means converting the appearance thereof to red lights warning the pilot of danger if he descends below the shallow segment of the approach path in the vicinity of said transition point.

5. A visual approach guide system for aircraft approaching a runway of an airport along a predetermined path comprising slope indicator means directly viewable by a pilot to guide the pilot along the path and supplementary indicator means directly viewable by a pilot to provide directional information as to the correct path to be flown to the slope indicator means, said supplementary indicator means including a series of light means such that they appear in the pilot's view sequentially in order to enable the pilot to make a correct change in the flight path of the plane.

6. The structure as defined in claim 5 wherein said slope indicator means includes warning red light means to indicate a low approach path, said red light means being invisible to the pilot until the aircraft is below a safe approach path, and said warning red light means being mounted adjacent to but below the slope indicator means.

7. A visual approach guide system for aircraft approaching a runway of an airport along a predetermined path comprising slope indicator means directly viewable by a pilot to guide the pilot along the path and supplementary indicator means directly viewable by a pilot to provide directional information as to the correct path to be flown, said slope indicator means includes a runway slope indicator and an off airport slope indicator, the off airport slope indicator guiding an aircraft in a steep segment of an approach path for noise control or obstruction clearance, the runway slope indicator guiding an aircraft in a shallow segment of an approach path, said supplementary indicator means being located between the slope indicators and being directly viewable by a pilot when an aircraft approaches the point of intersection between the segments of the approach path and indicating a transition from the outer segment to the inner segment, and said supplementary indicator means includes red light means becoming directly viewable by a pilot when the aircraft passes below the shallow segment of the approach path in the vicinity of intersection of the segments of the approach path to warn the pilot of danger.

8. The structure as defined in claim 7 wherein said red light means is a directional arrow indicating the direction to the runway slope indicator.

* * * * *